(12) United States Patent
Bacino et al.

(10) Patent No.: US 7,927,405 B2
(45) Date of Patent: Apr. 19, 2011

(54) POROUS COMPOSITE ARTICLE

(75) Inventors: John E. Bacino, Landenberg, PA (US);
John L. DiMeo, Wilmington, DE (US);
Alex R. Hobson, Elkton, MD (US);
Klaus Meindl, Munich (DE)

(73) Assignee: Gore Enterprise Holdings, Inc, Newark, DE (US)

( * ) Notice: Subject to any disclaimer, the term of this patent is extended or adjusted under 35 U.S.C. 154(b) by 615 days.

(21) Appl. No.: 11/738,761

(22) Filed: Apr. 23, 2007

(65) Prior Publication Data

US 2008/0257155 A1 Oct. 23, 2008

(51) Int. Cl.
*B01D 53/22* (2006.01)

(52) U.S. Cl. ............... 96/6; 96/4; 96/11; 96/12; 95/45; 95/46; 95/47; 95/51; 95/54; 210/640; 55/385.1; 55/385.2; 55/524

(58) Field of Classification Search ............ 96/4, 6, 96/11, 12, 13, 14; 95/45, 46, 47, 51, 54; 55/385.1, 385.2, 385.3, 487, 523, 524, DIG. 5; 210/640, 641

See application file for complete search history.

(56) References Cited

U.S. PATENT DOCUMENTS

| | | | |
|---|---|---|---|
| 3,341,497 A | 9/1967 | Sherman et al. | |
| 3,354,022 A | 11/1967 | Dettre et al. | |
| 3,953,566 A | 4/1976 | Gore | |
| 3,962,153 A | 6/1976 | Gore | |
| 4,096,227 A | 6/1978 | Gore | |
| 4,187,390 A | 2/1980 | Gore | |
| 4,230,463 A * | 10/1980 | Henis et al. | ......... 95/47 |
| 4,746,333 A * | 5/1988 | Peinemann et al. | ......... 96/12 |
| 4,754,009 A | 6/1988 | Squire | |
| 4,857,080 A * | 8/1989 | Baker et al. | ......... 95/56 |
| 4,945,125 A | 7/1990 | Dillon et al. | |
| 5,066,683 A | 11/1991 | Dillon et al. | |
| 5,116,650 A | 5/1992 | Bowser | |
| 5,156,780 A | 10/1992 | Kenigsberg et al. | |
| 5,157,058 A | 10/1992 | Dillon et al. | |
| 5,271,839 A | 12/1993 | Moya et al. | |
| 5,343,434 A | 8/1994 | Noguchi | |
| 5,352,513 A | 10/1994 | Mrozinski et al. | |
| 5,362,553 A | 11/1994 | Dillon et al. | |
| 5,370,836 A | 12/1994 | Yokoyama et al. | |
| 5,462,586 A | 10/1995 | Sugiyama et al. | |
| 5,466,509 A | 11/1995 | Kowligi et al. | |
| 5,539,072 A | 7/1996 | Wu | |
| 5,554,414 A | 9/1996 | Moya et al. | |
| 5,555,238 A * | 9/1996 | Miyazawa | ......... 347/86 |
| 5,627,042 A | 5/1997 | Hirose et al. | |
| 5,772,736 A * | 6/1998 | van Schravendijk et al. | ..... 95/46 |
| 5,919,878 A | 7/1999 | Brothers et al. | |
| 5,948,707 A * | 9/1999 | Crawley et al. | ......... 442/101 |
| 6,159,565 A | 12/2000 | Campbell et al. | |

(Continued)

FOREIGN PATENT DOCUMENTS

EP 0 307 123 3/1989

(Continued)

*Primary Examiner* — Jason M Greene
(74) *Attorney, Agent, or Firm* — Richard W. Ellis

(57) ABSTRACT

Porous composites comprise a porous membrane having a structure defining a plurality of pores extending therethrough, nonporous discontinuous surface layer affixed to said porous membrane, in which the nonporous discontinuous surface layer forms regions of gas permeability, and regions of gas impermeability, and a coating disposed upon the porous composite which renders at least a portion of the porous composite oleophobic.

32 Claims, 12 Drawing Sheets

U.S. PATENT DOCUMENTS

| | | |
|---|---|---|
| 6,196,708 B1 | 3/2001 | Rogers |
| 6,355,081 B1 | 3/2002 | Wang et al. |
| 6,410,084 B1 | 6/2002 | Klare et al. |
| 6,627,291 B1 | 9/2003 | Clark et al. |
| 6,638,610 B1 | 10/2003 | Yao |
| 6,676,993 B2 * | 1/2004 | Klare ............................ 427/245 |
| 6,683,126 B2 | 1/2004 | Keller et al. |
| 6,723,147 B2 * | 4/2004 | Mashiko et al. .................... 96/6 |
| 6,737,489 B2 | 5/2004 | Linert et al. |
| 6,780,497 B1 | 8/2004 | Walter |
| 6,840,982 B2 * | 1/2005 | Kunstadt et al. .................. 95/47 |
| 6,946,187 B2 * | 9/2005 | Hurten et al. ................. 428/203 |
| 7,279,025 B2 * | 10/2007 | Apte et al. ......................... 96/11 |
| 2001/0018096 A1 | 8/2001 | Klare |
| 2004/0025693 A1 * | 2/2004 | Bedingfield et al. ......... 55/385.4 |
| 2005/0061663 A1 | 3/2005 | Chen et al. |
| 2005/0087070 A1 * | 4/2005 | Odaka et al. ...................... 96/11 |
| 2005/0124242 A1 | 6/2005 | Norvell et al. |
| 2006/0047311 A1 | 3/2006 | Lutz et al. |
| 2007/0231542 A1 | 10/2007 | Deng et al. |

FOREIGN PATENT DOCUMENTS

| | | |
|---|---|---|
| EP | 0 513 392 | 11/1992 |
| EP | 0 729 901 | 9/1996 |
| EP | 1 216 089 | 6/2002 |
| WO | 94/13469 | 6/1994 |
| WO | 96/32635 | 10/1996 |
| WO | 2004/091747 | 10/2004 |
| WO | WO 2006/127946 | 11/2006 |

* cited by examiner

25 Perforation
27 Nonporous Film
24 Nonporous Discontinuous Surface Layer

POROUS COMPOSITE ARTICLE

BACKGROUND

Many enclosures require venting to an atmosphere external to an enclosure to relieve any pressure differential between the internal volume of the enclosure and the external atmosphere. Such venting may be required due to temperature fluctuations, altitude changes, and vapor pressure of liquid contained therein. Vents allow the flow of gas for pressure equalization while preventing the entry of liquid and particulate contamination. Market sectors which use porous materials as vents include, but are not limited to automotive, electronics, industrial, medical, and packaging. Expanded PTFE (ePTFE) is a known porous vent material in these applications. However, when these vent materials are exposed to viscous fluids of low surface tension, a loss in gas permeability may be observed. Residual liquid film or droplets remaining on the vent material may restrict the vent area available for gas flow. The fluid can dry and harden on the surface of the vent material, leaving an impermeable film layer on the entire surface, thereby rendering the vent inoperable by eliminating gas permeability. As used in this application, the term "gas permeability" means the property of a material having two sides allowing a gas to move from a first side to the second side when the material is subject to a differential pressure of such gas across it. Air permeability, for example, can be characterized by Gurley number.

There exists a need for a porous material that has adequate air flow after fluid exposure, especially in cases where the vent is exposed to a viscous fluid of low surface tension.

SUMMARY

In one aspect, a venting apparatus having an opening therein for venting an enclosure and for preventing passage of a liquid is provided. The venting apparatus comprises a porous composite venting element forming a gas-permeable barrier to said liquid, the porous composite venting element comprising a porous membrane having a structure defining a plurality of pores, extending therethrough, and a nonporous discontinuous surface coating. The nonporous discontinuous surface coating blocks at least some of the pores, whereby the porous composite surface has regions of gas permeability and regions of gas impermeability.

In another aspect, a porous composite comprising a porous membrane having a structure defining a plurality of pores extending therethrough is provided. A nonporous discontinuous surface layer is affixed to the porous membrane, the nonporous discontinuous surface layer has rents, which form surface regions of gas permeability and surface regions of gas impermeability. The porous composite has a coating which renders at least a portion of the surface oleophobic.

In yet another aspect, a venting apparatus is provided. The venting apparatus has an opening therein for venting an enclosure and for preventing passage of a liquid, and comprising a porous composite venting element forming a gas-permeable barrier to the liquid. The porous composite venting element comprises a porous membrane having a structure defining a plurality of pores extending therethrough, and a nonporous discontinuous surface layer affixed to said porous membrane. The nonporous discontinuous surface layer has rents, whereby the nonporous discontinuous surface layer comprises regions of gas permeability corresponding to the rents.

In a still further aspect, a venting apparatus is provided in which the venting apparatus has an opening therein for venting an enclosure. The enclosure defines an internal space and an external space, and the venting apparatus prevents passage of a liquid between the internal space and the external space. The venting apparatus comprises a porous composite venting element forming a liquid-tight, gas-permeable seal of the opening. The porous composite venting element has a liquid face adjacent to the liquid. The porous composite venting element comprises a porous membrane having a structure defining a plurality of pores extending therethrough and a nonporous discontinuous surface covering at least a portion of the liquid face of the porous membrane. The nonporous discontinuous surface blocks at least some of the pores and has openings therein to create surface regions of gas permeability and surface regions of gas impermeability.

In another aspect, a venting apparatus has an opening therein for venting an enclosure and prevents passage of a liquid. The venting apparatus comprises a porous composite venting element that forms a gas-permeable barrier to a liquid. The porous composite venting element comprises a porous membrane having a first face and a second face opposite the first face, and a nonporous surface layer affixed to the first face of the porous membrane to form a liquid exposure face. The airflow recovery after liquid exposure to the liquid exposure face of the porous composite venting element exceeds the airflow recovery after liquid exposure to the second face of said porous composite venting element.

DETAILED DESCRIPTION

The porous composite articles described herein are useful as venting materials. They provide air flow even after exposure to viscous fluids of low surface tension. As used in this application, the term "viscous fluids of low surface tension" means fluids with a viscosity greater than 50 cP (Centipoise) and surface tension less than 35 mN/m. In applications that involve such fluids, these porous composite articles overcome disadvantages of known venting materials.

In certain venting applications, gas permeability of the porous composite after exposure to viscous fluids of low surface tension is desired. Air flow after liquid exposure is referred to hereinafter as air flow recovery. Materials that have high air flow recovery after exposure to such fluids are particularly valuable. The porous composite articles described herein provide excellent air flow recovery after exposure to viscous fluids of low surface tension.

The porous composite articles can be used in a venting apparatus. A venting apparatus may include a vent body having an opening therein to allow venting. The porous composite may be affixed to the body to form a liquid-tight, gas-permeable seal of the opening. The venting apparatus may be used in a liquid-tight enclosure. As used in this application, "liquid-tight" means a seal or enclosure that can withstand a water entry pressure of at least 0.5 psi without leakage. Examples include a container for enclosing liquids or an electronic enclosure as in computer disk-drives, automotive engine control units, or automotive head-lamps.

Figure 1:
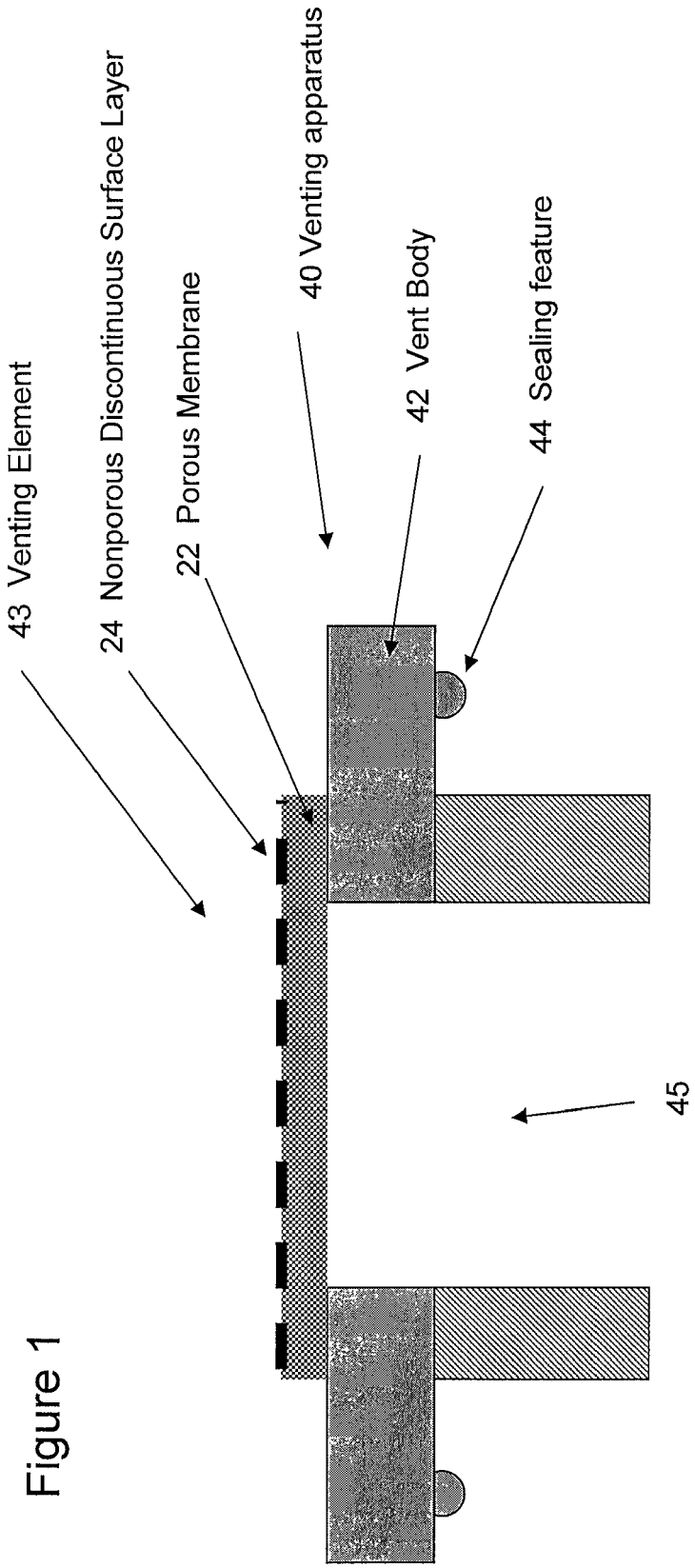
FIG. 1 represents a cross sectional view of the venting apparatus.

As shown in FIG. 1, venting apparatus 40 may include a vent body 42 having a passageway 45 for a gas, and a venting element 43. Venting element 43 may form a gas permeable liquid-tight seal of passageway 45.

Figure 2:
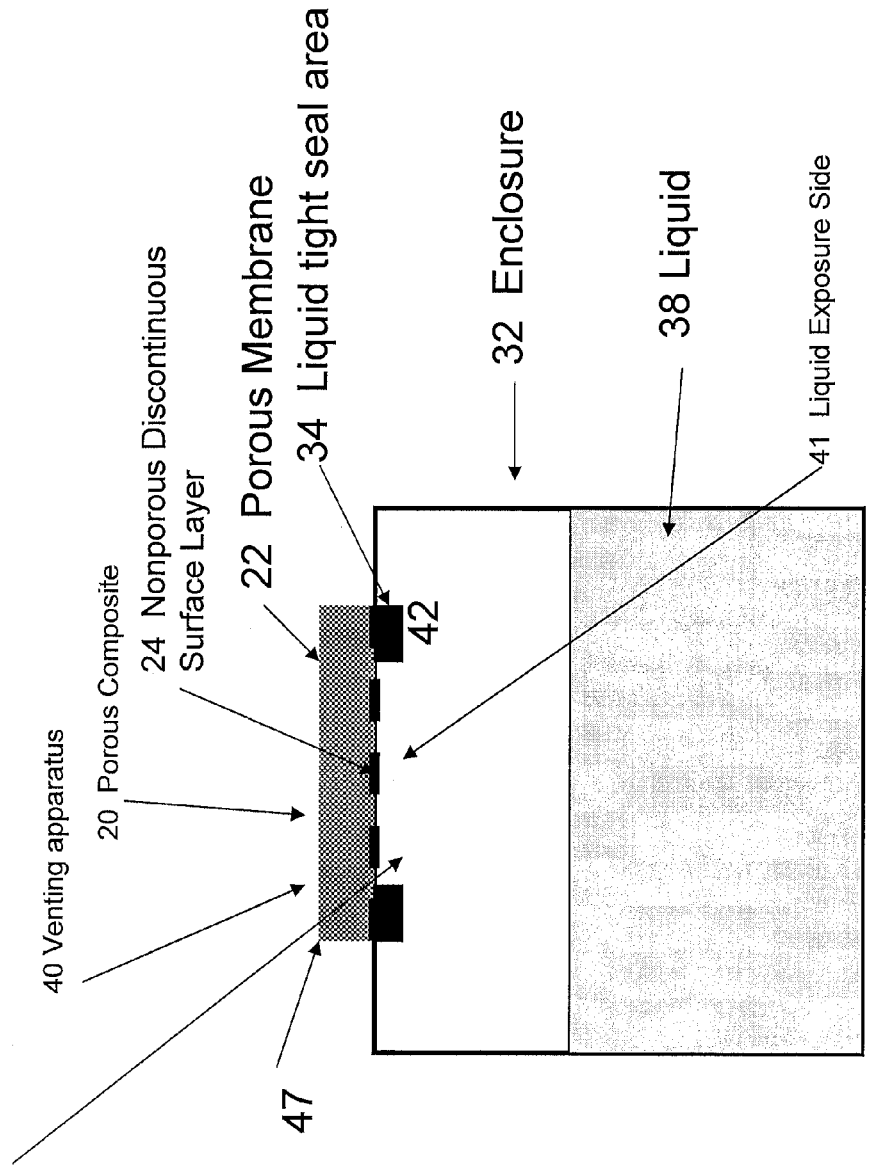
FIG. 2 represents a cross sectional view of the porous composite affixed to an opening in a liquid-tight enclosure.

The vent body 42 may take the form of an insert, cap, or a molded part. In other aspects, as represented in FIG. 2, an enclosure may have a vent body incorporated therein. In simple form, an enclosure may have an opening with a porous composite vent material sealed over it to provide venting.

Preferably, the vent body is constructed from polymeric materials, which facilitate easy processing including heat sealing of the porous composite article to the body. This vent body may be constructed in various shapes and forms and installed in any orientation (vertical, horizontal, or inclined at an angle) on to the enclosure. The means for attachment of the vent body to the enclosure depends on the intended venting application. Exemplary attachment means include interference fittings, threads or adhesives. As such, the vent body may incorporate barbs, threads and the like to improve attachment.

Figure 3:
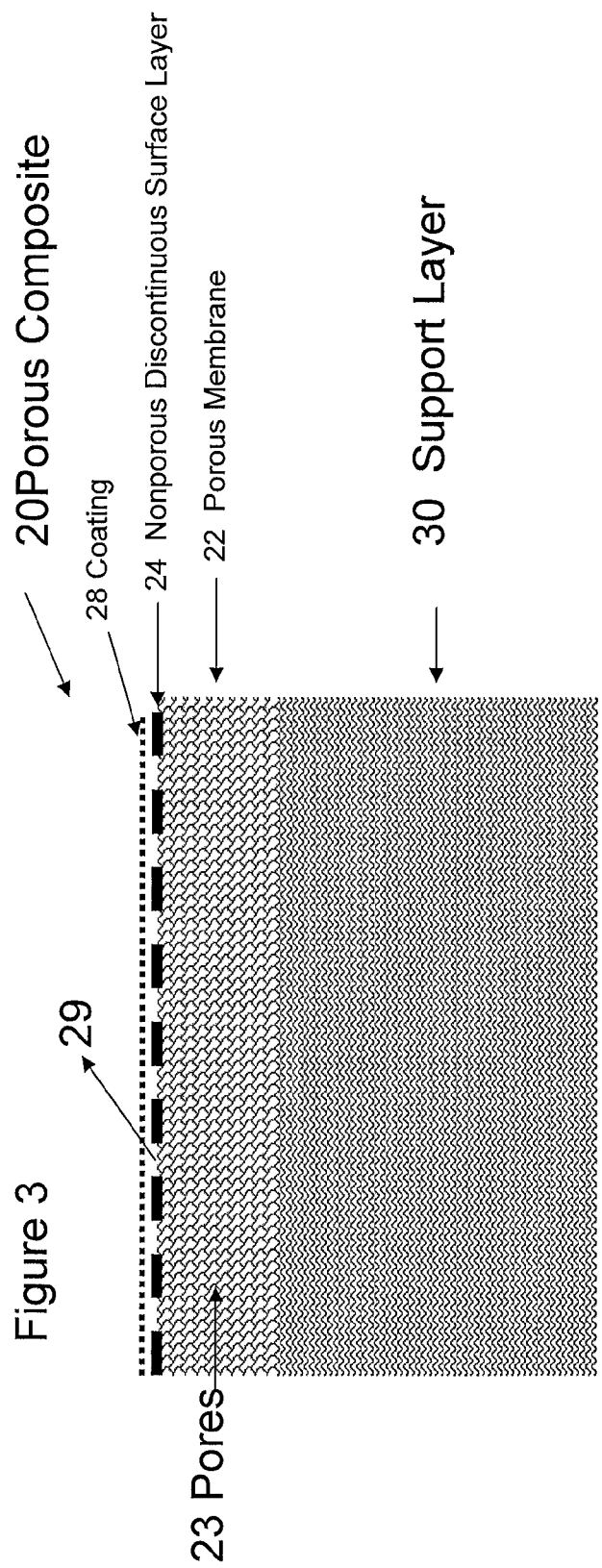
FIG. 3 represents a cross sectional view of the porous composite having an oleophobic coating affixed to a support layer.

With reference to FIG. 3, the porous composite article 20 may be comprised of a porous membrane 22 having pores 23, a nonporous discontinuous surface layer 24 that is affixed to the porous membrane, and a coating 28 to provide oleophobic properties. The nonporous discontinuous surface layer 24 blocks at least some of the pores 23 of the porous membrane but has discrete, distributed openings 29 which provide regions of gas permeability. The nonporous discontinuous surface layer improves the air flow recovery of the composite after exposure to viscous fluids of low surface tension. The porous composite can be rendered oleophobic by application of a polymeric coating 28 such that the oil rating of the composite is greater than about 2.

FIGS. 4 through 7 are scanning electron micrographs (SEM) of representative porous composites. The porous membrane 22 has a structure comprising a plurality of pores 23. The porous membrane can be any porous material that has pores which render the membrane gas permeable. Porous membranes may include but are not limited to, Polyethylene, Polypropylene, Polysulfone, Polyethersulfone, Polyvinylidene Fluoride (PVDF), Cellulose Acetate, Polycarbonate, Ultrahigh molecular weight polyethylene (UHMWPE), and preferably expanded PTFE. The expanded PTFE membranes made in accordance with the teachings in U.S. Pat. No. 3,953,566 to Gore are particularly useful. These porous membranes can be uni-axially, bi-axially or radially expanded.

The nonporous discontinuous surface layer 24 is affixed to the porous membrane 22 and may provide a discontinuous surface blocking at least some of the pores 23 of the porous membrane 22 at the membrane surface, whereby the porous composite surface has regions of gas permeability and regions of gas impermeability. The nonporous discontinuous surface layer 24 can be made from a wide range of materials including but not limited to thermoplastic materials, thermoset materials, and elastomeric materials. Thermoplastic materials are preferred and may include but are not limited to Polyester, Polyethylene, Polypropylene, Vinylidene Fluoride, tetrafluoroethylene/hexafluoropropylene copolymers (FEP), tetrafluoroethylene/perfluoroalkyl vinyl ether copolymers (PFA), chlorotrifluoroethylene (CTFE), and THV (polymer of tetrafluoroethylene, hexafluoropropylene, vinylidene fluoride). Fluorinated thermoplastic materials such as FEP or PFA are particularly preferred.

Figure 4:
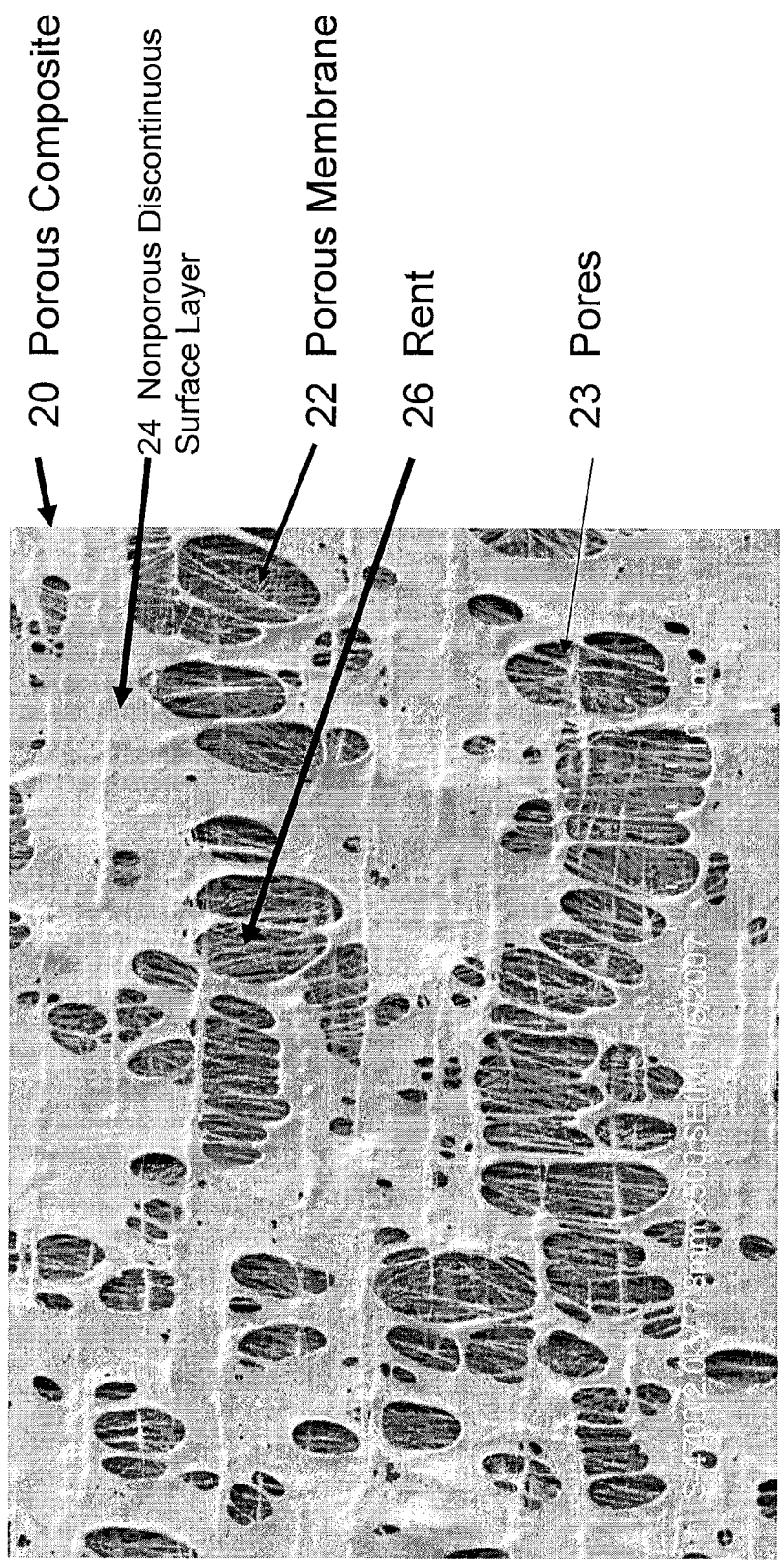
FIG. 4 is a surface Scanning Electron Micrograph (SEM) of a porous composite made in accordance with Example 1.
Figure 5:
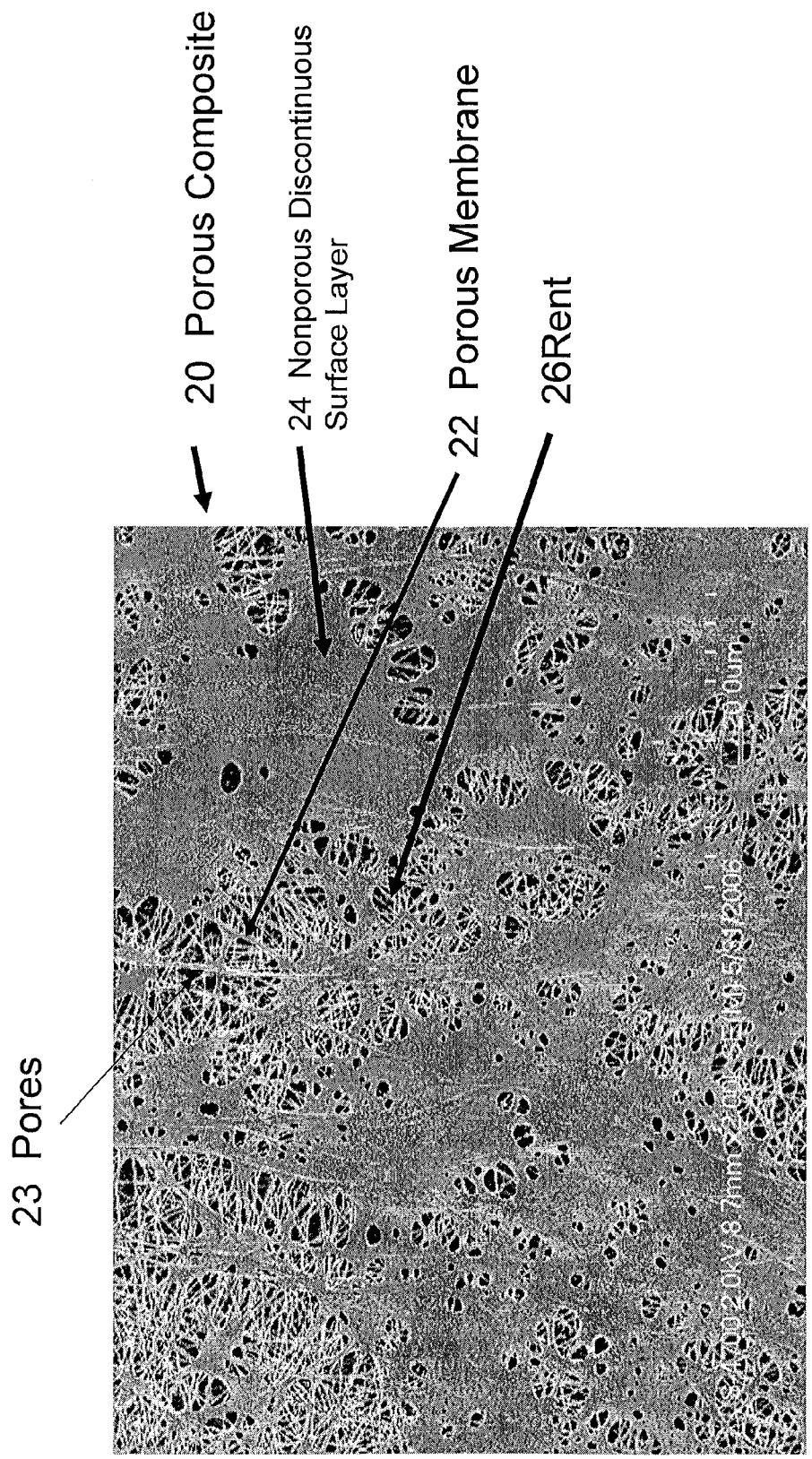
FIG. 5 is a surface Scanning Electron Micrograph (SEM) of a porous composite made in accordance with Example 2.
Figure 6:
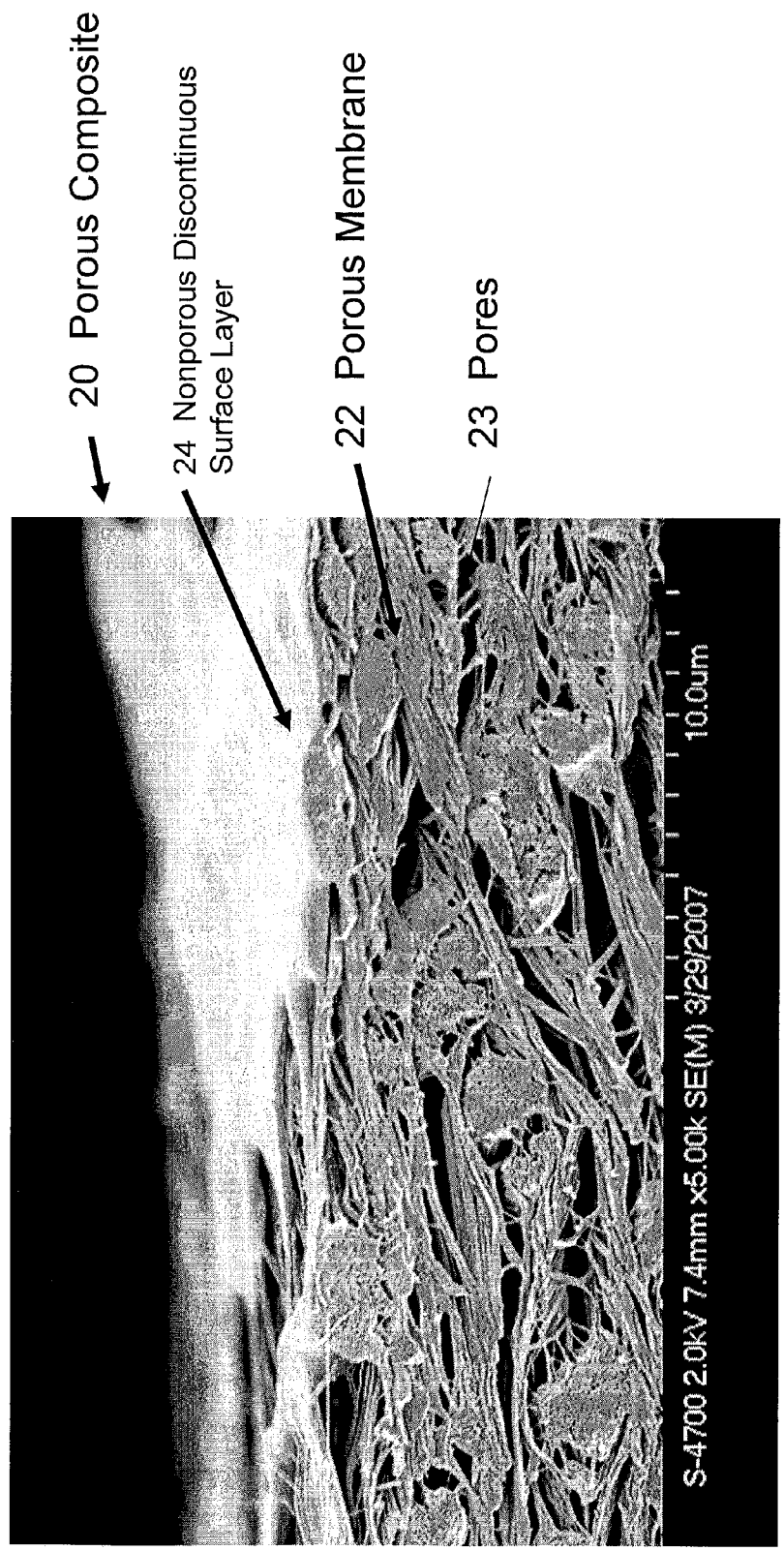
FIG. 6 is a Scanning Electron Micrograph (SEM) of a cross section of a porous composite made in accordance with Example 1.

In one embodiment illustrated by FIGS. 4 and 5, the nonporous discontinuous surface layer 24 is a fluorinated thermoplastic that is laminated to a PTFE tape and then co-expanded. Upon expansion, the fluorinated thermoplastic fractures to form a plurality of discrete rents 26. In another embodiment illustrated in FIG. 8, the nonporous discontinuous surface layer 24 comprises a nonporous film 27 having perforations 25. The perforated film is affixed to the porous membrane layer to form a porous composite.

Figure 7:
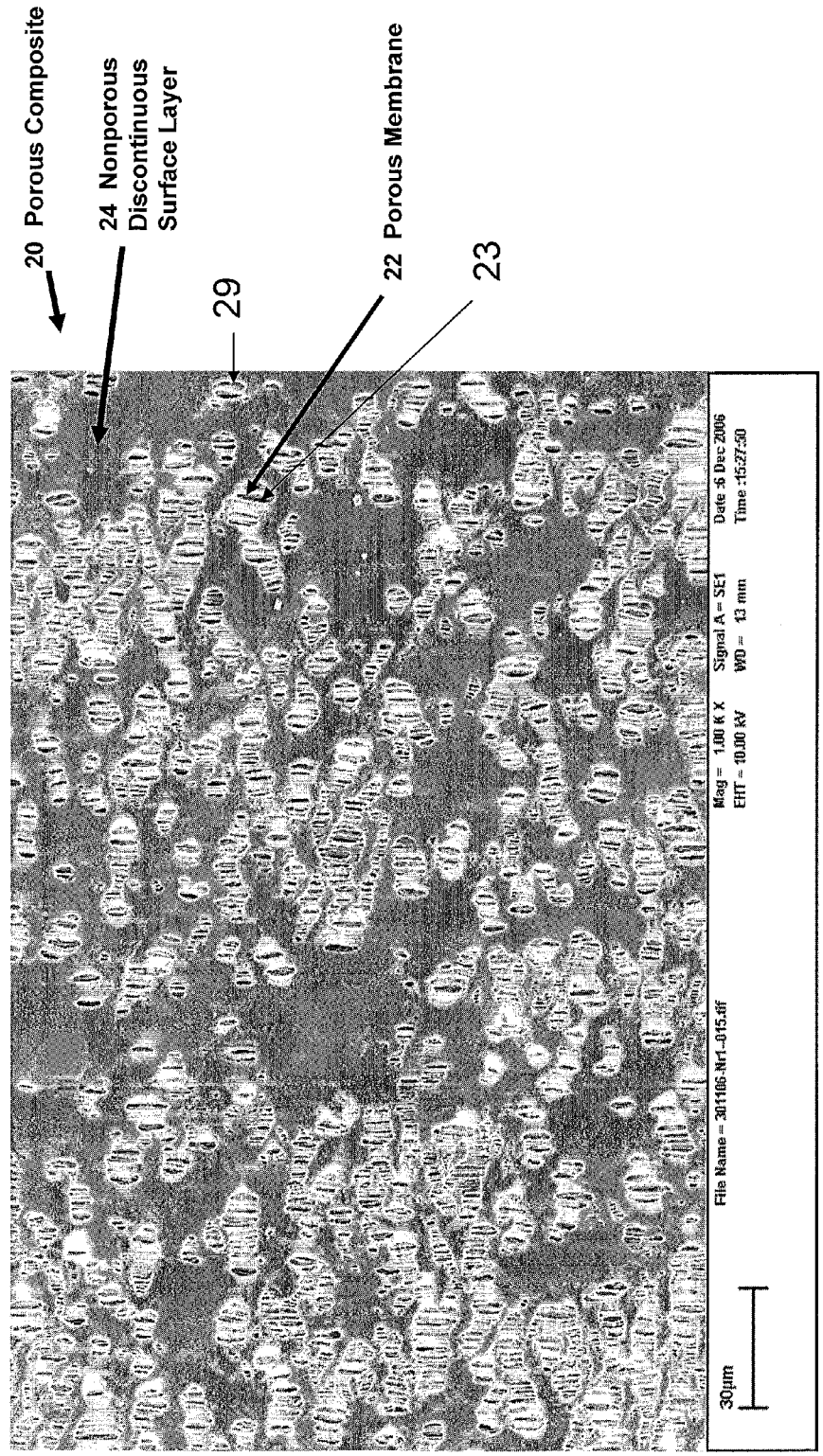
FIG. 7 is a surface Scanning Electron Micrograph (SEM) of a porous composite made in accordance with Example 5.

In a further embodiment illustrated in FIG. 7, the nonporous discontinuous surface layer 24 comprises a coating of a thermoplastic material. The coating forms a nonporous discontinuous surface layer 24 having openings 29 upon the porous membrane 22. The coating blocks some of the pores 23 to create regions of gas impermeability on the surface of the porous composite.

The porous composites can be rendered oleophobic, thereby making them applicable in certain venting applications which require resistance to viscous fluids of low surface tension. As used in this application, the term "oleophobic" means an article with an AATCC Test Method 118-2002 oil rating of greater than about 2. For example, the porous composite may be coated with a solution of perfluorodioxole polymer as described in U.S. Pat. No. 5,116,650. The coating may also be applied to at least one of the elements of the porous composite before affixing them together. For example, the porous membrane may be treated with a coating solution to provide oleophobicity before the nonporous discontinuous layer is affixed or applied to it.

A nonporous surface layer may be formed by a process of lamination and co-expansion. A nonporous thermoplastic film may be laminated to PTFE and subsequently expanded to form a composite of ePTFE membrane and a nonporous discontinuous surface layer comprised of fluorinated thermoplastic. This process may result in the thermoplastic film fracturing to form rents 26 as shown in FIGS. 4 and 5. The thermoplastic may be laminated to the ePTFE by passing the ePTFE and thermoplastic over a surface, such as a roller or plate that is heated to above the melt temperature of the thermoplastic to bond them. The bonded layers can then be expanded uni-axially, bi-axially or radially to form the rents in the thermoplastic surface. The nonporous discontinuous surface layer 24 of polymer in this embodiment can be as thin as 0.5 micron. In a preferred embodiment, FEP is laminated to PTFE and then the laminate is expanded to form a porous composite.

Figure 8:
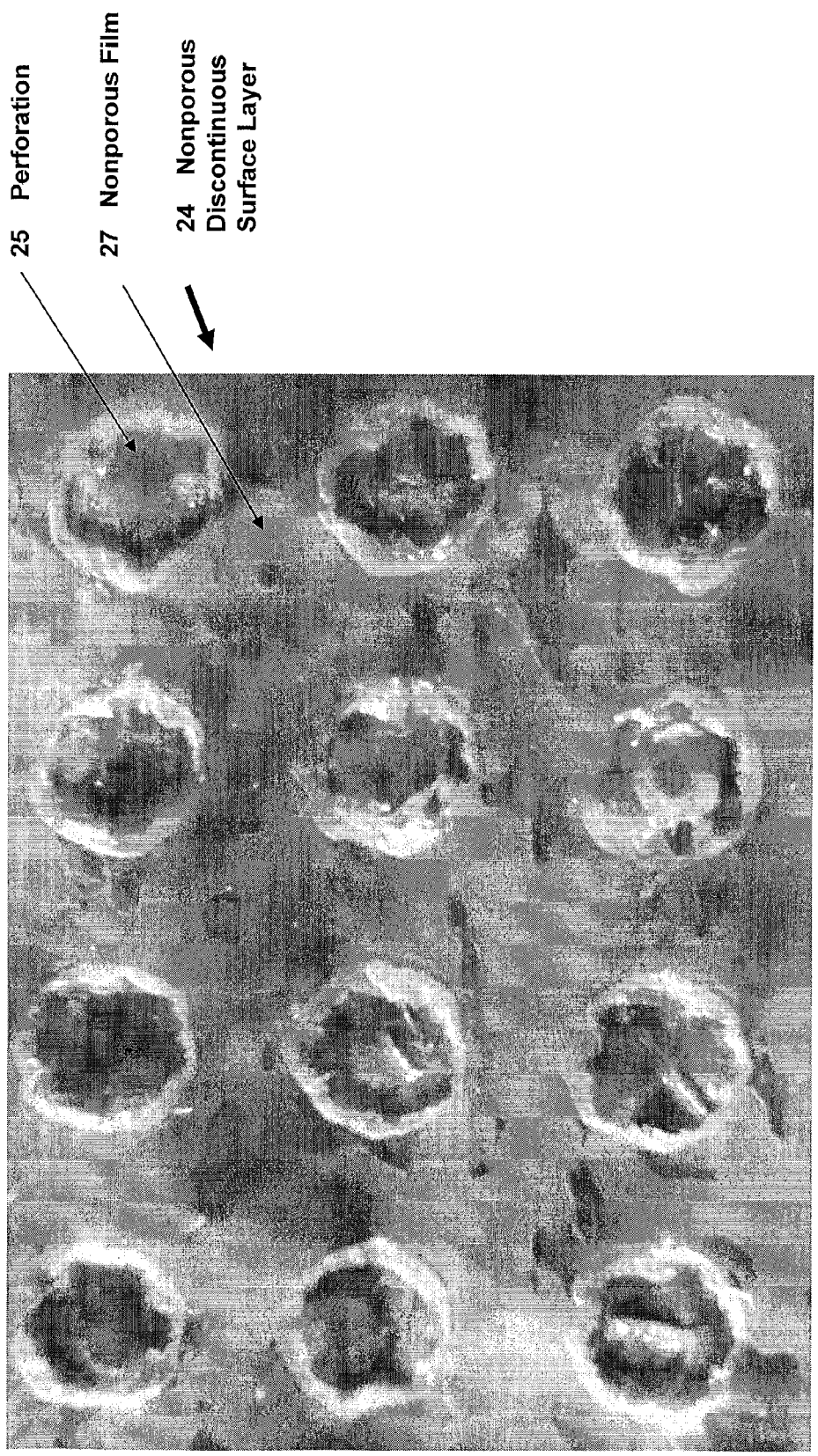
FIG. 8 is a surface Scanning Electron Micrograph (SEM) of a nonporous discontinuous surface layer.

With reference to FIG. 8, the nonporous discontinuous surface layer 24 may also be formed by perforating a nonporous film and then bonding it to a porous membrane. The preferred nonporous discontinuous surface layer is polymeric and may comprise a fluorinated thermoplastic film layer such as FEP or PFA. The nonporous polymeric film layer can be perforated using any conventional method, including but not limited to mechanical perforation, or laser drilling. The preferred method is laser drilling. The perforated nonporous discontinuous surface layer can then be affixed to a porous membrane through any conventional method including but not limited to, hot roll lamination, adhesive bonding, or ultrasonic bonding. In another aspect, the perforated nonporous film may be affixed to the PTFE and can be subsequently expanded.

In the embodiment illustrated in FIG. 8, a 12.5 micrometer thick sheet of FEP was perforated using a 50 watt laser machine from Universal Laser Systems Inc. (Scottsdale, Ariz.). The perforations 25 were 0.76 mm in diameter, and the center-center distance between perforations was 1.02 mm. The perforated FEP layer may then be bonded to a porous ePTFE membrane to form the porous composite.

Regardless of form or method of construction, the nonporous discontinuous surface layer forms a surface over the porous membrane layer such that some of the pores of the porous membrane are blocked. The nonporous discontinuous surface layer thus has a discontinuous surface with openings therein, whereby the porous composite has regions of gas permeability and regions of gas impermeability. The size and shape of the openings in the nonporous discontinuous surface layer can vary considerably.

Figure 9:
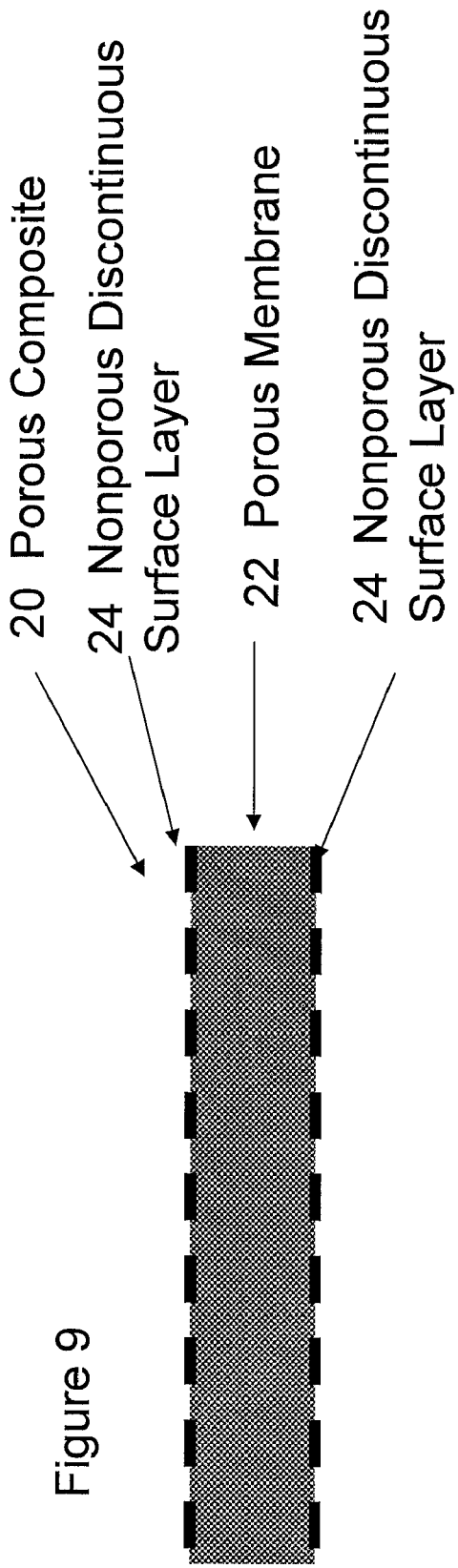
FIG. 9 represents a cross sectional view of a porous composite having a nonporous discontinuous surface layer on both sides of the porous membrane.

The porous composite articles may be used as a venting element in venting enclosures. The venting element may be advantageously used to form a liquid-tight seal in an enclosure for containing or excluding liquids. The venting element provides gas permeability necessary for gas expansion, off-gassing of chemicals, and the like. As shown in FIG. 2, venting apparatus 40 may be constructed to have a liquid exposure side 41 and an opposite side 47. A nonporous discontinuous surface layer 24 may be disposed upon the porous membrane 22 to construct a liquid exposure side 41 of the porous composite 20. The liquid exposure side 41 may be oriented towards the interior of an enclosure 32 containing a liquid 38. In these applications (e.g. liquid detergent containers) the liquid is contained, yet the porous composite provides gas permeability. The gas permeability may prevent enclosure deformation or rupture due to thermal cycling, or allow for off gassing of the liquid. In an alternate embodiment illustrated in FIG. 10, in which liquid entry is to be prevented, the liquid exposure side 41 may be oriented towards the outside of the enclosure 32. The opposite side 47 is oriented towards the inside of the enclosure. In such applications, (e.g. electronics enclosures or lighting enclosures) the porous composite may provide gas permeability while preventing liquid entry into the enclosure. In yet another construction illustrated schematically in FIG. 9, both sides of the porous composite may be constructed as liquid exposure sides.

Preferably, the air flow recovery of the liquid exposure side exceeds the air flow recovery of the opposite side by a value of at least 1.1%. More preferably, the air flow recovery of the liquid exposure side exceeds the air flow recovery of the opposite side by a value of at least 5%. In embodiments in which the porous composite has two liquid exposure sides, it is preferable that the air flow recovery of the porous composite exceeds the air flow recovery of the porous membrane alone by at least about 5%.

In an embodiment, the porous oleophobic composite may have an air flow recovery of at least about 33% when the liquid exposure side of the composite is exposed to viscous fluid of low surface tension. The airflow recovery of this composite when the same viscous fluid of low surface tension is exposed to the opposite side is 0%. More preferably, the porous composite has an air flow recovery of at least about 50% when the liquid exposure side of the composite is exposed to viscous fluid of low surface tension. The airflow recovery of this composite when the same viscous fluid of low surface tension is exposed to the opposite side is 0%.

In another embodiment, the porous composite has an air flow recovery of 4% when the liquid exposure side of the composite is exposed to viscous fluid of low surface tension. The airflow recovery of the porous composite when the same viscous fluid of low surface tension is exposed to the opposite side is 0.4%. More preferably, the porous composite has an air flow recovery of 12% when the liquid exposure side of the composite is exposed to viscous fluid of low surface tension. The airflow recovery of the porous composite when the same viscous fluid of low surface tension is exposed to the opposite side is 0.1%.

Figure 10:
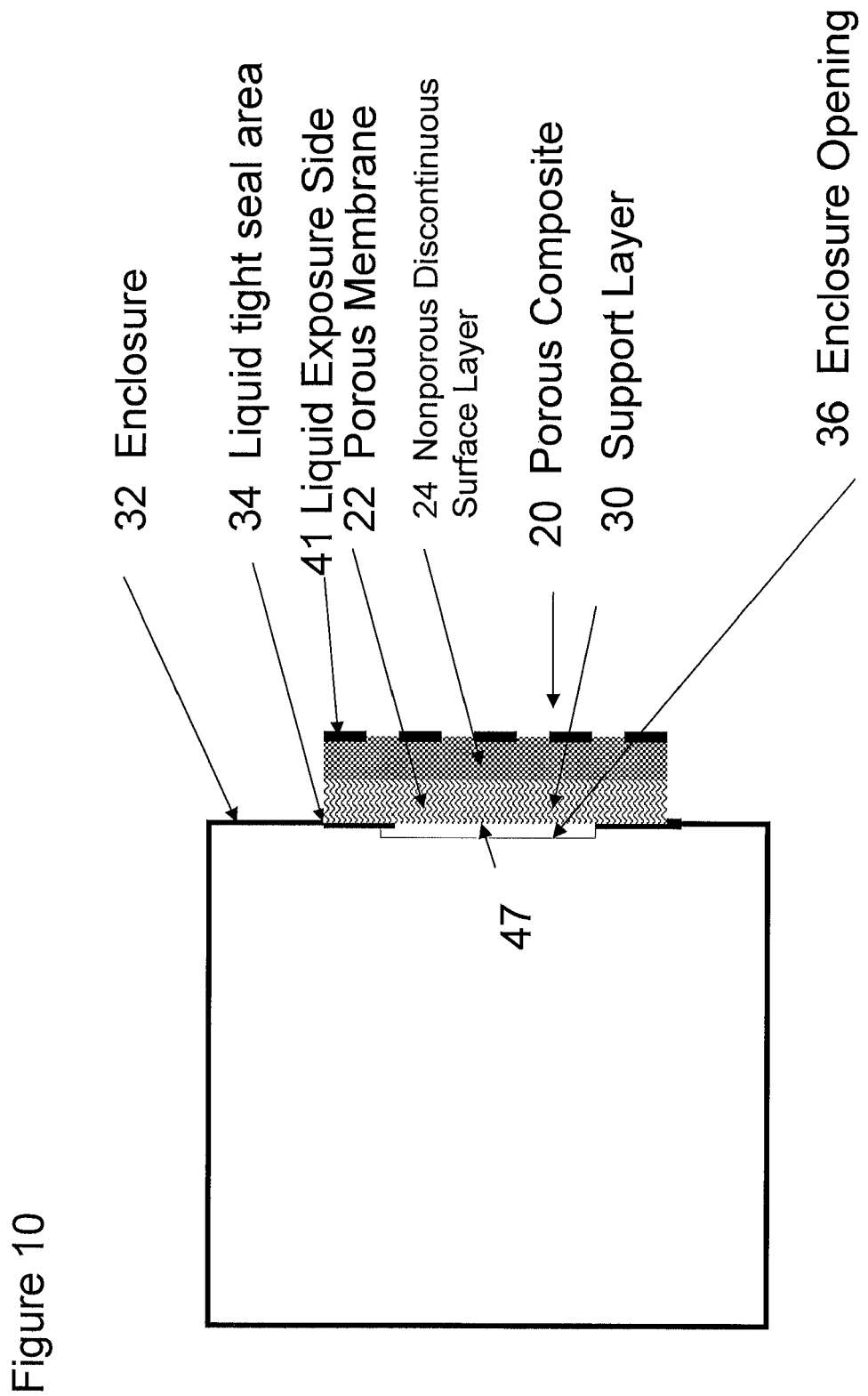
FIG. 10 represents a cross sectional view of the porous composite affixed over an opening in a liquid-tight enclosure.

The porous composite can be constructed as a laminate. The laminate may be constructed by supporting the porous composite 20 on a support layer 30, as shown in FIG. 3. Support layer 30 provides structural support and may also aid in attachment of the porous composite 20 to venting enclosure 32 as shown in FIG. 10. Suitable support layers can be in the form of air permeable media like knits, non-wovens, scrims, melt-blowns, woven fabrics, meshes, foams, porous ePTFE membranes, etc. Support layers may be affixed to the porous composite by, for example, hot-roll lamination, adhesives, or ultrasonic bonding. The support layer may be affixed to either side of the porous composite.

The present invention will be further described with respect to the non-limiting examples provided below.

Test Methods

Density

Samples die cut to form rectangular sections 2.54 cm by 15.24 cm were measured to determine their mass (using a Mettler-Toledo analytical balance model AG204) and their thickness (using a Kafer FZ1000/30 snap gauge). Using these data, density was calculated with the following formula:

$$\rho = \frac{m}{w * l * t}$$

in which: $\rho$=density (g/cc); m=mass (g); w=width (cm); l=length (cm); and t=thickness (cm).

Porosity

Figure 11:
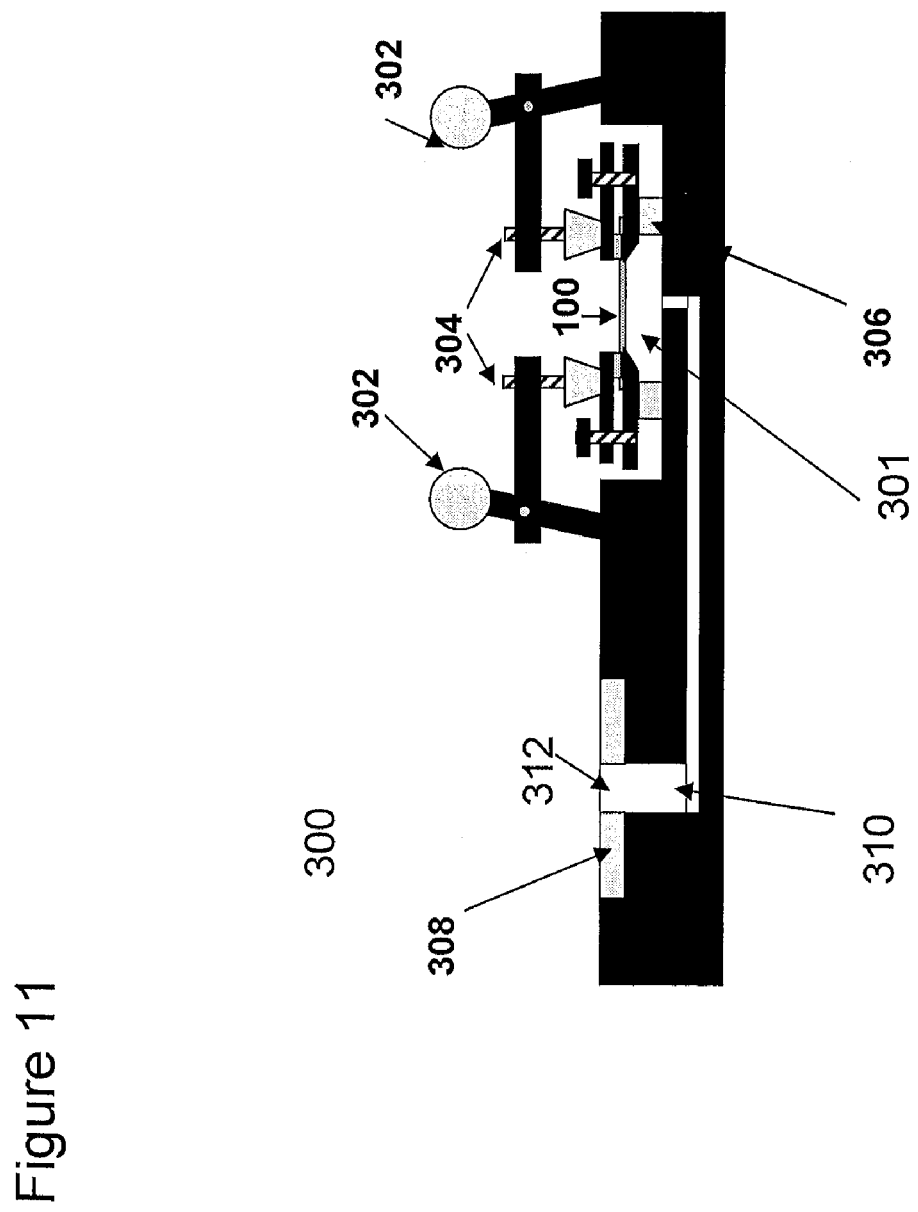
FIGS. 11 and 11a illustrate a testing apparatus for air flow recovery.
Figure 11A:
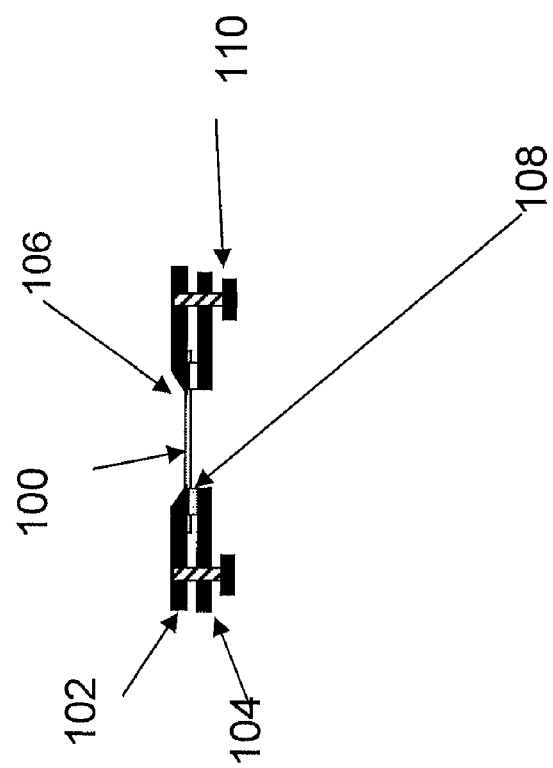

Porosity was expressed in percent porosity and was determined by subtracting the quotient of the density of the article (described earlier herein) and that of the bulk density of PTFE from 1, then multiplying that value by 100%. For the purposes of this calculation, the bulk density of PTFE was taken to be 2.2 g/cc Air Flow Recovery FIGS. 11 and 11a illustrate the apparatus used for airflow recovery testing. Vent material 100 is sealed between upper plate 102 and lower plate 104. The plates each include an orifice of diameter 2.54 cm. The upper plate incorporates a liquid well 106. The vent material 100 is secured between the plates using a gasket 108 and thumb screws 110. The assembled plates are then secured in an adapter 300 by means of clamps 302, thumb screws 304 and a gasket 306. Adapter 300 includes an air chamber 301 and channel 310 for delivering air to it. A Telydyne Genuine Gurley™ tester (Model Number 4110) is attached to the inlet port 312 of the adapter 300 using the gasket 308.

100 cm$^3$ of air is delivered to the sample at a pressure of 12.4 cm of water and the flow time recorded in seconds. This measurement is Gurley (seconds) before fluid contact.

The plate is then removed from the adapter and the vent material is exposed to test fluid by filling liquid well 106 such that the entire surface of the vent material is covered by the fluid. This can be done by using a transfer pipette to add about 2 to 3 cm$^3$ of test fluid to the well 106. After 60 seconds, the plate assembly was tilted ninety degrees. The liquid is allowed to drain off from the vent material for 60 seconds. The plate is then secured in the adapter 300 which is affixed to the Telydyne Genuine Gurley™ tester (Model Number 4110).

100 cm$^3$ of air is allowed to flow through the sample at a pressure of 12.4 cm of water and the flow time recorded in seconds. This measurement is Gurley (seconds) after fluid contact. In cases where airflow did not start after ten minutes in this test, the test was stopped and samples were considered not to recover as denoted by NR for no recovery of airflow. The percentage air flow recovery is then determined by using the equation:

$$\text{Air flow recovery}(\%) = \left(\frac{Gurley(\text{seconds}) \text{ before fluid contact}}{Gurley(\text{seconds}) \text{ after fluid contact}}\right) * 100$$

Water Entry Pressure

As used in this application, the term "water entry pressure" means the pressure required to drive water through a material, such as a membrane, as further described in the test methods contained herein. Water entry pressure provides a test method for water intrusion through membranes or vent bodies. The membrane (or vent body) is placed in a fixture and pressurized with water. A piece of pH paper may be placed on top of the membrane (or vent body) on the non-pressurized side as an indicator of evidence for water entry. The sample is then pressurized in small increments, until a color change in the pH paper indicates the first sign of water entry. The water pressure at breakthrough or entry is recorded as the Water Entry Pressure.

Bubble Point

The bubble point and mean flow pore size were measured according to the general teachings of ASTM F31 6-03 using a Capillary Flow Porometer (Model CFP 1500 AEXL from Porous Materials Inc., Ithaca, N.Y.). The sample membrane was placed into the sample chamber and wet with SilWick Silicone Fluid (available from Porous Materials Inc.) having a surface tension of 19.1 dynes/cm. The bottom clamp of the sample chamber had a 2.54 cm diameter, 3.175 mm thick porous metal disc insert (Mott Metallurgical, Farmington, Conn., 40 micron porous metal disk) and the top clamp of the sample chamber had a 3.175 mm diameter hole. Using the Capwin software version 6.62.1 the following parameters were set as specified in the table immediately below. The values presented for bubble point and mean flow pore size were the average of two measurements.

| Parameter | Set Point | Parameter | Set Point |
| --- | --- | --- | --- |
| maxflow (cc/m) | 200000 | mineqtime (sec) | 30 |
| bublflow (cc/m) | 100 | presslew (cts) | 10 |
| F/PT (old bubltime) | 40 | flowslew (cts) | 50 |
| minbppres (PSI) | 0 | eqiter | 3 |
| zerotime (sec) | 1 | aveiter | 20 |
| v2incr (cts) | 10 | maxpdif (PSI) | 0.1 |
| preginc (cts) | 1 | maxfdif (cc/m) | 50 |
| pulse delay (sec) | 2 | sartp (PSI) | 1 |
| maxpre (PSI) | 500 | sartf (cc/m) | 500 |
| pulse width (sec) | 0.2 | | |

Oil Rating

Oil rating testing was conducted in accordance with AATCC Test Method 118-2002. The oil rating of a membrane is the lower of the two ratings obtained when testing the two sides of the membrane.

Surface Tension

Surface tension of the challenge fluid was measured using a Kruss K12 tensiometer using the Whilhelmy plate method. Kruss Laboratory Desktop Software Version 2.13a was used. Whilhelmy plate immersions were conducted with flamed glass cover slips and the software default dip parameters.

Viscosity

Viscosity was measured using a Brookfield DVII+ viscometer with a UL low volume spindle and tube accessory. Viscosities are reported in centipoise (cP) for a temperature of 22.5 degrees Celsius, at 30 RPM, and a shear rate of 36.7 second$^{-1}$. Viscosities were read after five minutes at 30 RPM for samples which had previously been run at the maximum RPM allowed by torque.

Challenge Fluids

Two representative challenge fluids were formulated and used for air flow recovery testing after fluid exposure. Properties of these fluids are listed in the table below. Challenge Fluid I was used for oleophobic articles with an oil rating of greater than about 2. Challenge Fluid II was used for hydrophobic articles.

Challenge Fluid I was prepared in the following manner:

A solution of PVP (Polyvinylpyrrolidone, Sigma-Aldrich Chemical, Catalog Number 437190-500G, Molecular Weight=1,300,000, CAS Number 9003-39-8), and De-ionized water was prepared by mixing the two components and allowing them to stir overnight. Tergitol®TMN6 (Dow Chemical, CAS Number 60828-78-6) was added and the solution was allowed to stir for about one hour and then used immediately for testing.

Challenge Fluid II was prepared in the following manner:

A solution of Tween® (Mallinckrodt Baker, Inc., Catalog Number X257-07, CAS Number 9005-65-6), and De-ionized water was prepared by mixing the two components and allowing them to stir overnight. Glycerol (Ultra Pure Grade, MP Biomedicals, Catalog Number 800688) was added and the solution was allowed to stir for about one hour and then used immediately for testing.

| Fluid | Viscosity (cP) | Surface Tension (mN/m) | Components (parts per unit weight) |
| --- | --- | --- | --- |
| Challenge I | 70 | 27 | De-ionized Water: (92) Tergitol ® TMN6: (1) PVP: (7) |
| Challenge II | 169 | 34 | De-ionized Water: (32) Glycerol: (48) Tween ®: (20) |

EXAMPLES

Example 1

Fine powder of PTFE polymer (Daikin Industries, Ltd., Orangeburg, N.Y.) was blended with Isopar K (Exxon Mobil Corp., Fairfax, Va.) in the proportion of 0.25 g/g of fine powder. The lubricated powder was compressed in a cylinder to form a pellet and placed into an oven set at 25° C. for approximately 24 hours. Compressed and heated pellets were ram extruded to produce tapes approximately 29 cm wide by 0.635 mm thick. The tape was then calendared between compression rolls to a thickness of 0.20 mm. The tape was then dried in an oven set at 250° C. The dry PTFE tape and a 12.5 um thick FEP film were layered together and longitudinally expanded between banks of rolls over two heated plates set to a temperature of 300° C. The speed ratio between the second bank of rolls and the first bank of rolls, and hence the expansion ratio on the first plate, was 1.15:1. The speed ratio between the third bank of rolls and the second bank of rolls, and hence the expansion ratio on the second plate, was 1.15:1. The composite FEP laminated PTFE tape was then longitudinally expanded 5:1, through a hot air oven set to a temperature of 320° C. The FEP film bonded to the PTFE tape as it melted and as the two layers expanded, rents were formed in the FEP film. The longitudinally expanded composite was then heat treated through a hot air oven set to a temperature of 360° C. The composite was then expanded transversely at a temperature of approximately 370° C. to a ratio of approximately 7:1 and then constrained and heated in an oven set at 370° C. for approximately 24 seconds.

The porous composite thus produced had a Bubble Point of 6.9 psi. Both sides of the composite were tested for air flow recovery with challenge fluid II. Results are shown in Table I.

The composite was treated to render it oleophobic according to the following procedure. A solution was prepared by adding 0.25 weight percent of Teflon AF 1600 (Dupont Fluoroproducts, Wilmington, Del.) to PF-5070 Brand Performance Fluid (CAS Number 86508-42-1, 3M) and allowing the fluid to mix overnight. The composite sample was held taut in an embroidery hoop (15.2 cm diameter). A pipette was then used to apply 5 to 6 cm$^3$ of the above solution to the (liquid exposure side) of the composite sample. The composite sample was tilted and rotated such that the solution completely saturated the sample. At this point, the sample became transparent and was visibly wet throughout. The hoop was immediately hung vertically in a hood and allowed to dry overnight. Both sides of the oleophobic composite were then tested for air flow recovery using Challenge Fluid I. The results obtained are shown in Table I. The oil rating was measured to be 5.

TABLE I

| | Permeability before fluid contact Gurley (secs) | Permeability after fluid contact Gurley (secs) | Air Flow Recovery (%) |
|---|---|---|---|
| COMPOSITE | | | |
| Membrane Side | 1.4 | 1400 | 0.1 |
| Liquid Exposure Side | 1.4 | 11.7 | 12 |
| OLEOPHOBIC COMPOSITE | | | |
| Membrane Side | 7.4 | 1794 | 0.4 |
| Liquid Exposure Side | 6.5 | 12.9 | 50 |

Example 2

Fine powder of PTFE polymer (Daikin Industries, Ltd., Orangeburg, N.Y.) was blended with Isopar K (Exxon Mobil Corp., Fairfax, Va.) in the proportion of 0.196 g/g of fine powder. The lubricated powder was compressed in a cylinder to form a pellet and placed into an oven set at 70° C. for approximately 12 hours. Compressed and heated pellets were ram extruded to produce tapes approximately 15.2 cm wide by 0.73 mm thick. Two separate rolls of tape were produced and layered together between compression rolls to a thickness of 0.254 mm. The tape was then transversely stretched to 56 cm (i.e., at a ratio of 3.7:1), then dried in an oven set at 250° C. The dry tape was longitudinally expanded between banks of rolls over a heated plate set to a temperature of 340° C. A 12.5 micron thick FEP film was layered onto the PTFE tape prior to expansion over the plate. The speed ratio between the second bank of rolls and the first bank of rolls, and hence the expansion ratio, was 14:1. The FEP film bonded to the PTFE tape as it melted and as the two layers expanded, rents were formed in the FEP film. The longitudinally expanded composite was then expanded transversely at a temperature of approximately 350° C. to a ratio of approximately 20:1 and then constrained and heated in an oven set at 380° C. for approximately 24 seconds.

The porous composite thus produced had a Bubble Point of 30 psi. Both sides of the composite were tested for air flow recovery with challenge fluid II. Results are shown in Table II.

The composite was treated to render it oleophobic according to the following procedure. A solution was prepared by adding 0.25 weight percent of Teflon AF 1600 (Dupont Fluoroproducts, Wilmington, Del.) to PF-5070 Brand Performance Fluid (CAS Number 86508-42-1, 3M) and allowing the fluid to mix overnight. The composite sample was held taut in an embroidery hoop (15.2 cm diameter). A pipette was then used to apply 5 to 6 cm$^3$ of the above solution to the liquid exposure side of the composite sample. The composite sample was tilted and rotated such that the solution completely saturated the sample. At this point, the sample became transparent and was visibly wet throughout. The hoop was immediately hung vertically in a hood and allowed to dry overnight. Both sides of the oleophobic composite were then tested for air flow recovery using Challenge Fluid I. Results are shown in Table II. The oil rating was measured to be 6.

TABLE II

| | Permeability before fluid contact Gurley (secs) | Permeability after fluid contact Gurley (secs) | Air Flow Recovery (%) |
|---|---|---|---|
| COMPOSITE | | | |
| Membrane Side | 1.1 | 367 | 0.3 |
| Liquid Exposure Side | 1.1 | 18.3 | 6 |
| OLEOPHOBIC COMPOSITE | | | |
| Membrane Side | 14.2 | No flow (NR) | 0 |
| Liquid Exposure Side | 15.8 | 27.4 | 58 |

Example 3

Fine powder of PTFE polymer (Daikin Industries, Ltd., Orangeburg, N.Y.) was blended with Isopar K (Exxon Mobil Corp., Fairfax, Va.) in the proportion of 0.25 g/g of fine powder. The lubricated powder was compressed in a cylinder to form a pellet and placed into an oven set at 25° C. for approximately 24 hours. Compressed and heated pellets were ram extruded to produce tapes approximately 29 cm wide by 0.635 mm thick. The tape was then calendared between compression rolls to a thickness of 0.20 mm. The tape was then dried in an oven set at 250° C. The dry PTFE tape and a 12.5 micron thick PFA film were layered together and longitudinally expanded between banks of rolls over two heated plates set to a temperature of 320° C. The speed ratio between the second bank of rolls and the first bank of rolls, and hence the expansion ratio on the first plate, was 1.15:1. The speed ratio between the third bank of rolls and the second bank of rolls, and hence the expansion ratio on the second plate, was 1.15:1. The PFA/PTFE tape laminate was then longitudinally expanded 8:1, through a hot air oven set to a temperature of 320° C. The longitudinally expanded composite was then heat treated through a hot air oven set to a temperature of 360° C. The composite was then expanded transversely at a temperature of approximately 380° C. to a ratio of approximately 2.4:1 and then constrained and heated in an oven set at 380° C. for approximately 24 seconds.

The porous composite thus produced had a Bubble Point of 0.5 psi. Both sides of the composite were tested for air flow recovery with challenge fluid II. Results are shown in Table III.

The composite was treated to render it oleophobic according to the following procedure. A solution was prepared by adding 0.25 weight percent of Teflon AF 1600 (Dupont Fluoroproducts, Wilmington, Del.) to PF-5070 Brand Performance Fluid (CAS Number 86508-42-1, 3M) and allowing the fluid to mix overnight. The composite sample was held taut in an embroidery hoop (15.2 cm diameter). A pipette was then used to apply 5 to 6 cm$^3$ of the above solution to the surface liquid exposure side of the composite sample. The composite sample was tilted and rotated such that the solution completely saturated the sample. At this point, the sample became transparent and was visibly wet throughout. The hoop was immediately hung vertically in a hood and allowed to dry overnight. Both sides of the oleophobic composite were then tested for air flow recovery Challenge Fluid 1. The results obtained are shown in Table III. The oil rating was measured to be 6.

TABLE III

| | Permeability before fluid contact Gurley (secs) | Permeability after fluid contact Gurley (secs) | Air Flow Recovery (%) |
|---|---|---|---|
| COMPOSITE | | | |
| Membrane Side | 0.4 | 100 | 0.4 |
| Liquid Exposure Side | 0.4 | 10 | 4 |
| OLEOPHOBIC COMPOSITE | | | |
| Membrane Side | 0.3 | No Flow (NR) | 0 |
| Liquid Exposure Side | 0.3 | 0.9 | 33 |

Example 4

A 12.5 micrometer thick sheet of FEP was perforated using a 50 watt laser machine from Universal Laser Systems Inc. (Scottsdale, Ariz.). Size of the perforations were 0.76 mm in diameter, the center-center distance between perforations was 1.02 mm. The perforated FEP sheet was laminated to an ePTFE membrane (thickness of 22.8 microns, density of 0.39 g/cm$^3$, and bubble point of 8 psi) using a web of co-polyester (Spunfab, Inc. Product Number PE2900-0.6-45W) as an adhesive layer. The materials were laminated together in a heat press (Geo. Knight & Co, MA) using the following conditions: 160 degrees, 60 psi, 3 seconds. The composite was evaluated for air flow recovery using challenge fluid II. Results appear in Table IV.

TABLE IV

| | Permeability before fluid contact Gurley (secs) | Permeability after fluid contact Gurley (secs) | Air Flow Recovery (%) |
|---|---|---|---|
| Membrane Side | 5.2 | 467 | 1.1 |
| Liquid Exposure Side | 5.5 | 48 | 11 |

Example 5

5 g FEP powder (Product Number 532-8000 from DuPont) was added to a mixture of 47.5 g of 2-Propanol (IPA) and 47.5 g of HFE-7500 (3M NOVEC™ Engineered Fluid). The dispersion was stirred for a few hours until a clear solution was formed. An ePTFE membrane having a thickness of 106 micron, porosity of 64%, and density of 0.78 g/cc was coated with this solution using a continuous immersion coating process. In this process, the ePTFE membrane was passed through a first roller and then passed through a bath containing the coating solution using a second immersion roller. After this coating step, the membrane was dried for 4 hours at room temperature in a ventilated hood. A thin layer of FEP particles was left on the surface of the membrane. To melt the particles, the coated membrane was fixed on a tenter frame, and placed in a sinter oven at a temperature of 320° C. for 5 minutes. The porous composite thus produced had a nonporous discontinuous surface layer as shown in FIG. 7. The porous composite was rendered oleophobic by coating with a solution of 0.75 weight percent Teflon AF 1600 (DuPont Fluoroproducts, Wilmington, Del.) in solvent PF-5070 (CAS Number 86508-42-1, 3M) and dried for 6 hours at room temperature in a ventilated hood.

We claim:
1. A porous composite comprising:
    (a) porous membrane having a structure defining a plurality of pores extending therethrough,
    (b) nonporous discontinuous surface layer affixed to said porous membrane, said nonporous discontinuous surface layer having a thickness of less than 5 μm and having rents, wherein the rents form regions of gas permeability, and
    (c) a coating disposed upon wherein at least a portion of the porous composite is rendered oleophobic.
2. The porous composite of claim 1 wherein the said porous membrane comprises expanded PTFE.
3. The porous composite of claim 1 wherein the said microporous membrane comprises UHMWPE.
4. The porous composite of claim 1 wherein the said nonporous discontinuous surface layer comprises thermoplastic.
5. The porous composite of claim 1 wherein the said nonporous discontinuous surface layer comprises fluoroplastic.
6. The porous composite of claim 1 wherein the said nonporous discontinuous surface layer comprises FEP.
7. The porous composite of claim 1 wherein said porous composite has an oil rating of greater than about 2.
8. The porous composite of claim 1 wherein the said porous composite is laminated to a support layer.
9. The porous composite of claim 8 wherein the said support layer comprises a nonwoven.
10. The porous composite of claim 8 wherein the said support layer comprises an expanded PTFE membrane.
11. A venting apparatus having an opening therein for venting an enclosure and for preventing passage of a liquid, said venting apparatus comprising a porous composite vent- ing element forming a gas-permeable barrier to said liquid, said porous composite venting element comprising:
  a) porous membrane having a structure defining a plurality of pores extending therethrough, and
  b) nonporous discontinuous surface layer affixed to said porous membrane, said nonporous discontinuous surface layer having a thickness of less than 5 µm and having rents, whereby the nonporous discontinuous surface layer comprises regions of gas permeability corresponding to the rents.

12. The venting apparatus of claim 11 in which the venting element has a liquid exposure side oriented towards the liquid, the liquid exposure side comprising said nonporous discontinuous surface layer.

13. The venting apparatus of claim 11 in which the porous composite venting element has a interior face and an exterior face and wherein the interior face and the exterior face comprise said nonporous discontinuous surface layer.

14. The venting apparatus of claim 11 wherein the said porous membrane comprises expanded PTFE.

15. The venting apparatus of claim 11 wherein the said porous membrane comprises UHMWPE.

16. The venting apparatus of claim 11 wherein the said nonporous discontinuous surface layer comprises thermoplastic.

17. The venting apparatus of claim 11 wherein the said nonporous discontinuous surface layer comprises fluoroplastic.

18. The venting apparatus of claim 11 wherein the said nonporous discontinuous surface layer comprises FEP.

19. The venting apparatus of claim 11 wherein the said porous composite has an oil rating greater than about 2.

20. The venting apparatus of claim 11 wherein the said porous composite is laminated to a support layer.

21. A venting apparatus having an opening therein for venting an enclosure and for preventing passage of a liquid, said venting apparatus comprising:
  porous composite venting element forming a gas-permeable barrier to said liquid, said porous composite venting element comprising:
    a) porous membrane having a structure defining a plurality of pores, extending therethrough,
    b) nonporous discontinuous surface coating said porous membrane, said nonporous discontinuous surface coating having a thickness of less than 5 µm and blocking at least some of the pores, whereby the porous composite surface has regions of gas permeability and gas impermeability.

22. The porous composite of claim 21 wherein the said nonporous discontinuous surface layer comprises thermoplastic.

23. The porous composite of claim 21 wherein the said nonporous discontinuous surface layer comprises fluoroplastic.

24. The porous composite of claim 21 wherein the said nonporous discontinuous surface layer comprises FEP.

25. A venting apparatus having an opening therein for venting an enclosure, said enclosure defining an internal space and an external space, said venting apparatus preventing passage of a liquid between the internal space and the external space, the venting apparatus comprising:
  a porous composite venting element forming a liquid-tight, gas-permeable seal of said opening, said porous composite venting element having a liquid face adjacent to the liquid, the porous composite venting element comprising:
    a) porous membrane having a structure defining a plurality of pores extending therethrough,
    b) nonporous discontinuous surface covering at least a portion of the liquid face of said porous membrane, said nonporous discontinuous surface having a thickness of less than 5 µm and blocking at least some of the pores and having openings therein, and
    whereby the surface of said porous composite has regions of gas permeability and regions of gas impermeability.

26. The venting apparatus of claim 25 wherein the said microporous composite venting element further comprises an oleophobic coating.

27. The venting apparatus of claim 25 wherein said microporous membrane layer is expanded PTFE.

28. The venting apparatus of claim 25 wherein said microporous membrane layer is UHMWPE.

29. The venting apparatus of claim 25 wherein said nonporous discontinuous surface layer comprises thermoplastic.

30. The venting apparatus of claim 25 wherein said nonporous discontinuous surface layer comprises fluoropolymer.

31. The venting apparatus of claim 25 wherein said nonporous discontinuous surface layer comprises FEP.

32. The venting apparatus of claim 25 wherein the said porous composite surface has regions of gas permeability and regions of gas impermeability and wherein the area ratio of gas permeability to gas impermeability is no greater than 0.2:1.

* * * * *